US010274044B2

(12) United States Patent
Takarabe (10) Patent No.: US 10,274,044 B2
(45) Date of Patent: Apr. 30, 2019

(54) BELT DRIVING APPARATUS

(71) Applicant: DAIHEN Corporation, Osaka-shi, Osaka (JP)

(72) Inventor: Sayako Takarabe, Osaka (JP)

(73) Assignee: DAIHEN Corporation, Osaka (JP)

(*) Notice: Subject to any disclaimer, the term of this patent is extended or adjusted under 35 U.S.C. 154(b) by 0 days.

(21) Appl. No.: 16/037,563

(22) Filed: Jul. 17, 2018

(65) Prior Publication Data

US 2018/0335106 A1 Nov. 22, 2018

Related U.S. Application Data

(63) Continuation of application No. 13/705,603, filed on Dec. 5, 2012, now Pat. No. 10,047,837.

(30) Foreign Application Priority Data

Dec. 6, 2011 (JP) .................................. 2011-267002

(51) Int. Cl.
*F16G 1/28* (2006.01)
*F16H 7/02* (2006.01)
(Continued)

(52) U.S. Cl.
CPC ............... *F16G 1/28* (2013.01); *F16H 7/023* (2013.01); *F16H 19/06* (2013.01);
(Continued)

(58) Field of Classification Search
CPC .... F16G 1/28; F16H 7/023; F16H 2007/0865; F16C 13/006; B65H 2402/25
See application file for complete search history.

(56) References Cited

U.S. PATENT DOCUMENTS 1,502,080 A * 7/1924 Wilson ............... B61D 43/00
105/101
2,581,261 A * 1/1952 Landau ............... D03D 1/0094
139/383 R
(Continued)

FOREIGN PATENT DOCUMENTS

EP 0 849 499 A1 6/1998
JP 55-51148 A 4/1980
(Continued)

OTHER PUBLICATIONS

Office Action issued in counterpart Japanese Patent Application (dated May 25, 2015).
(Continued)

*Primary Examiner* — Michael A Riegelman
(74) *Attorney, Agent, or Firm* — Hamre, Schumann, Mueller & Larson, P.C.

(57) ABSTRACT

A belt driving apparatus includes a driving pulley, a driven pulley and an endless toothed belt. Each of the driving pulley and the driven pulley includes an outer circumference surface provided with a plurality of teeth. The toothed belt, wound around the driving pulley and the first driven pulley, includes an inner surface provided with a plurality of teeth arranged to mesh with the teeth of the driving pulley and the first driven pulley. The belt driving apparatus also includes an idler pulley having a belt contact surface coming into contact with the outer surface of the toothed belt. As viewed along the width direction of the belt contact surface, the idler pulley includes a center portion and two end portions sandwiching the center portion. The center portion of the idler pulley is greater in diameter than each of the two end portions.

14 Claims, 10 Drawing Sheets

(51) Int. Cl.
*F16H 19/06* (2006.01)
*F16C 13/00* (2006.01)
*F16H 7/08* (2006.01)

(52) U.S. Cl.
CPC ........ *B65H 2404/25* (2013.01); *F16C 13/006* (2013.01); *F16H 2007/0865* (2013.01); *F16H 2019/0686* (2013.01)

(56) References Cited

U.S. PATENT DOCUMENTS

| | | | |
|---|---|---|---|
| 2,735,474 A * | 2/1956 | Sherwood | B21D 31/00 72/378 |
| 4,084,683 A | 4/1978 | Moss | |
| 4,458,403 A | 7/1984 | Foster | |
| 5,209,705 A | 5/1993 | Gregg | |
| 5,222,918 A | 6/1993 | Abe et al. | |
| 6,273,243 B1 | 8/2001 | Loose et al. | |
| 6,685,785 B1 | 2/2004 | Morris et al. | |
| 7,665,950 B2 | 2/2010 | Uratani et al. | |
| 8,216,101 B2 | 7/2012 | Numajiri | |
| 2007/0137766 A1 | 6/2007 | Matsuda et al. | |
| 2008/0191409 A1 | 8/2008 | Talken et al. | |
| 2008/0279656 A1 * | 11/2008 | Uratani | H01L 21/67742 414/217 |
| 2012/0058851 A1 | 3/2012 | Shimizu et al. | |
| 2012/0142467 A1 | 6/2012 | Chang et al. | |
| 2017/0088367 A1 * | 3/2017 | Takarabe | B25J 5/02 |

FOREIGN PATENT DOCUMENTS

| | | |
|---|---|---|
| JP | 4-80952 U | 7/1992 |
| JP | 9-4686 A | 1/1997 |
| JP | 10-252844 A | 9/1998 |
| JP | 2004-84709 A | 3/2004 |
| JP | 2005-23947 A | 1/2005 |
| JP | 2006-123135 A | 5/2006 |
| JP | 2008-272847 A | 11/2008 |
| JP | 2008-279538 A | 11/2008 |
| JP | 2009-74648 A | 4/2009 |

OTHER PUBLICATIONS

Office Action issued in corresponding Japanese Patent Application, dated Oct. 25, 2016.

* cited by examiner

FIG.16

BELT DRIVING APPARATUS

BACKGROUND OF THE INVENTION

1. Field of the Invention

The present invention relates to a belt driving apparatus including a driving pulley, a driven pulley, and an endless toothed belt wound around the pulleys. In particular, the present invention relates to a belt driving apparatus for use in a transfer robot having a belt-driving-type linear transfer mechanism.

2. Description of the Related Art

As a type of robot for transferring workpieces, robots having a mechanism for moving a hand along a linear movement path (linear movement mechanism) are known (see JP-A-2008-272847, for example). Such a transfer robot having a linear movement mechanism has a simple structure and is inexpensive as compared with articulated robots, and hence, is widely used to transfer a wafer, a glass substrate or the like into or out of a chamber in manufacturing a semiconductor device or a liquid crystal panel, for example.

Figure 11:
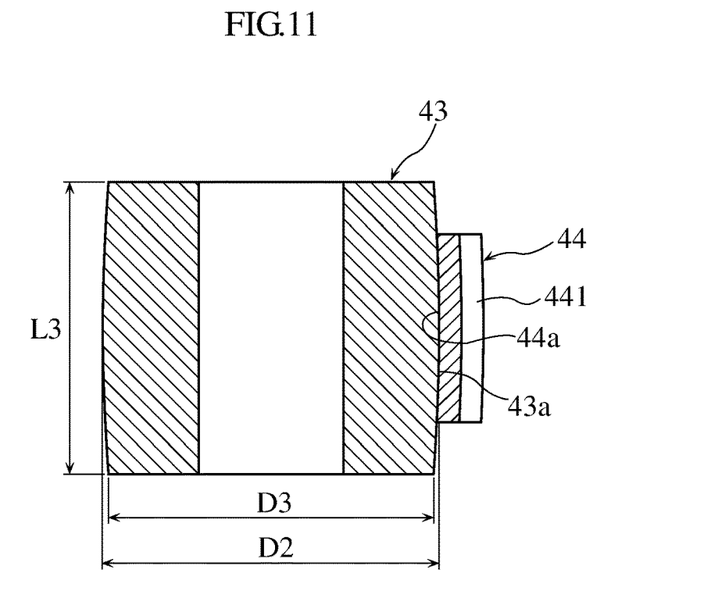
FIG. 11 is a sectional view taken along lines XI-XI in FIG. 10.

The transfer robot disclosed in JP-A-2008-272847 includes a belt driving apparatus for driving the linear movement mechanism. As shown in FIG. 11 and so on of this document, the belt driving apparatus includes a plurality of pulleys including a driving pulley rotated by a driving force from a driver source, and two driven pulleys. An endless output belt is wound around the pulleys. The pulleys are rotatable about respective rotation axes which are set generally parallel to each other. The output belt is provided with a connection member connected to a hand. The hand is slidably held by a linear guide rail and moves linearly in accordance with reciprocal movement of the connection member along a movement path between the driven pulleys. Between the driving pulley and each of the driven pulleys is provided an idler pulley held in contact with the outer surface of the output belt for applying tension to the output belt.

In recent years, the size of a workpiece such as a panel for making a liquid crystal panel is being increased, and hence there is a demand for increasing the movement distance of a hand of a transfer robot for holding a workpiece. Moreover, to enhance the productivity, transferring workpieces at high speed and with high accuracy is also demanded. In a transfer robot using the above-described belt driving apparatus, the movement distance of the hand can be increased relatively easily by increasing the lengths of the output belt and the guide rail for supporting the hand. Further, the transfer speed can also be increased by using toothed pulleys as the driving pulley and driven pulleys and using, as the output belt, a timing belt (toothed belt) having teeth on the inner surface for meshing with the pulleys. This arrangement prevents slipping between the output belt and the driving pulley or driven pulleys in the travel direction of the belt.

In a belt driving apparatus having an output belt wound around a plurality of pulleys, it is desirable that the rotation axes of the pulleys are set precisely parallel to each other. In practice, however, due to errors in making or mounting each pulley, it is difficult to set the rotation axes of the pulleys parallel to each other with sufficient accuracy. Further, output belts vary from each other. Because of these reasons, when an output belt runs, the output belt may deviate toward one side in the axial direction of the pulley (driving pulley or driven pulley) so that an edge of the output belt may come into contact with a collar portion provided at each end of the pulley in the axial direction. In such a case, the output belt cannot run stably and may break if continues traveling. When the length of the output belt is increased or the travel speed of the belt is increased to realize high-speed transfer of workpieces, the amount of displacement of the output belt in the width direction increases, which increases the possibility that the above-described problem will occur.

SUMMARY OF THE INVENTION

The present invention has been proposed under the circumstances described above. It is therefore an object of the present invention to provide a belt driving apparatus capable of preventing deviation during traveling of an endless toothed belt wound around a driving pulley and a driven pulley.

To achieve the above-described object, the present invention takes the following technical means.

According to an embodiment of the present invention, there is provided a belt driving apparatus comprising: a driving pulley including an outer circumference surface provided with a plurality of teeth; a first driven pulley including an outer circumference surface provided with a plurality of teeth; an endless toothed belt wound around the driving pulley and the first driven pulley, the toothed belt including an inner surface provided with a plurality of teeth meshing with the plurality of teeth of each of the driving pulley and the first driven pulley; and a first idler pulley including a belt contact surface coming into contact with an outer surface of the toothed belt, the first idler pulley including, along a width direction of the belt contact surface, a center portion and two end portions sandwiching the center portion, the center portion being greater in diameter than each of the two end portions.

Preferably, the belt driving apparatus of the present invention may further comprise: a second driven pulley including an outer circumference surface provided with a plurality of teeth; and a second idler pulley including a belt contact surface coming into contact with the outer surface of the toothed belt. The first driven pulley and the second driven pulley define therebetween a straight travel section in which the toothed belt is caused to move along a straight travel path. The first idler pulley and the second idler pulley are arranged to sandwich the driving pulley in a travel direction of the toothed belt.

Preferably, each of the first and the second idler pulleys may have a winding angle indicating a contact region between the belt contact surface of said each of the first and the second idler pulleys and the outer surface of the toothed belt, where the winding angle is not less than 50°, for example.

Preferably, the toothed belt may be provided with a carriage that is moved reciprocally in the straight travel section.

Preferably, the belt driving apparatus of the present invention may further comprise an angle adjustment mechanism for adjusting the angle of the axis of the first idler pulley with respect to the axis of the driving pulley.

Preferably, the belt driving apparatus of the present invention may further comprise an auto tension mechanism including a biasing member for urging the outer surface of the toothed belt via the first idler pulley.

Preferably, in the belt driving apparatus of the present invention, the plurality of teeth of the toothed belt are inclined with respect to a width direction of the toothed belt. Correspondingly, the plurality of teeth of the driving pulley are inclined with respect to an axis of the driving pulley, and the plurality of teeth of the first driven pulley are inclined with respect to an axis of the first driven pulley.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below with reference to the accompanying drawings.

Figure 1:
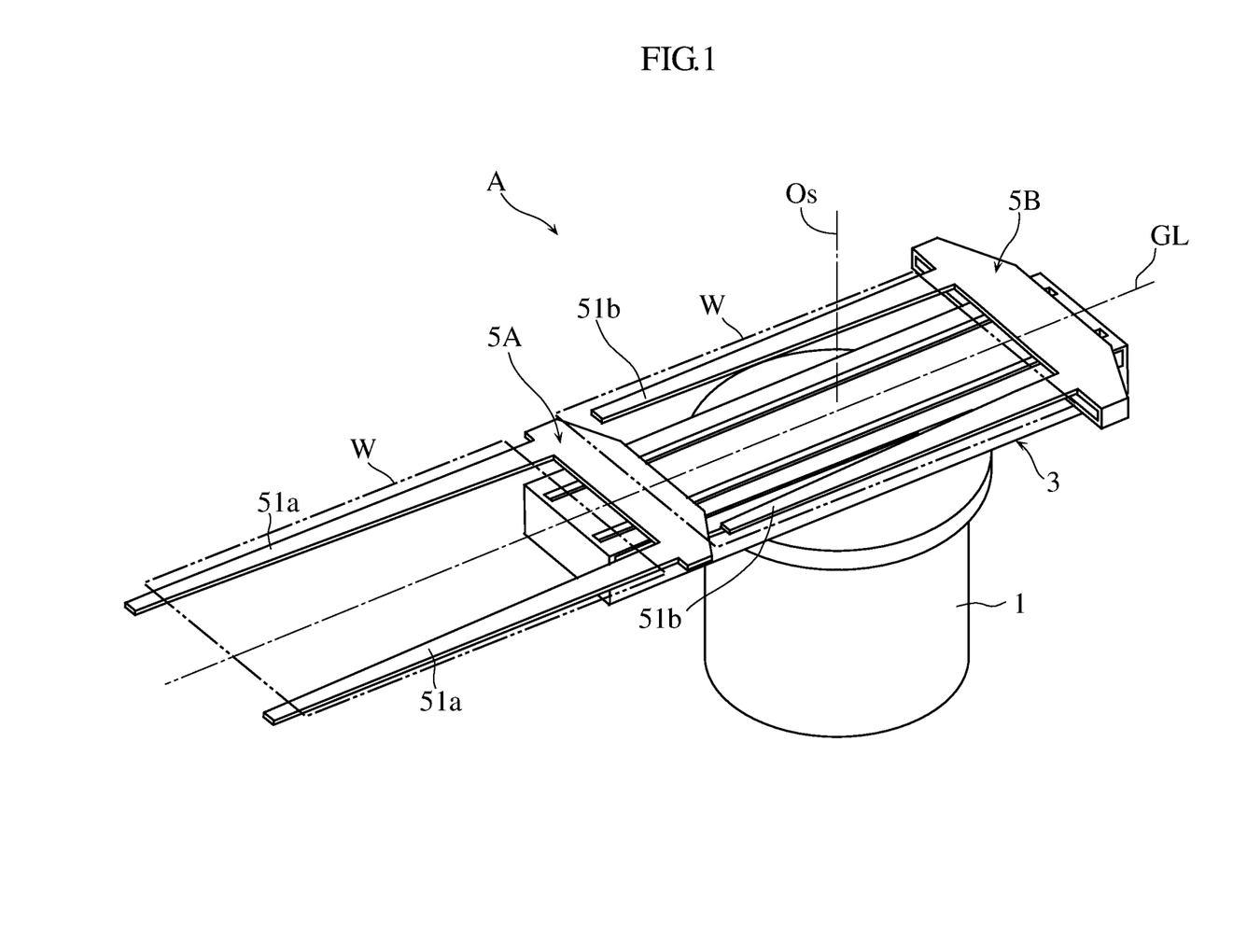
FIG. 1 is an overall perspective view showing a transfer robot including a belt driving apparatus according to the present invention.
Figure 2:
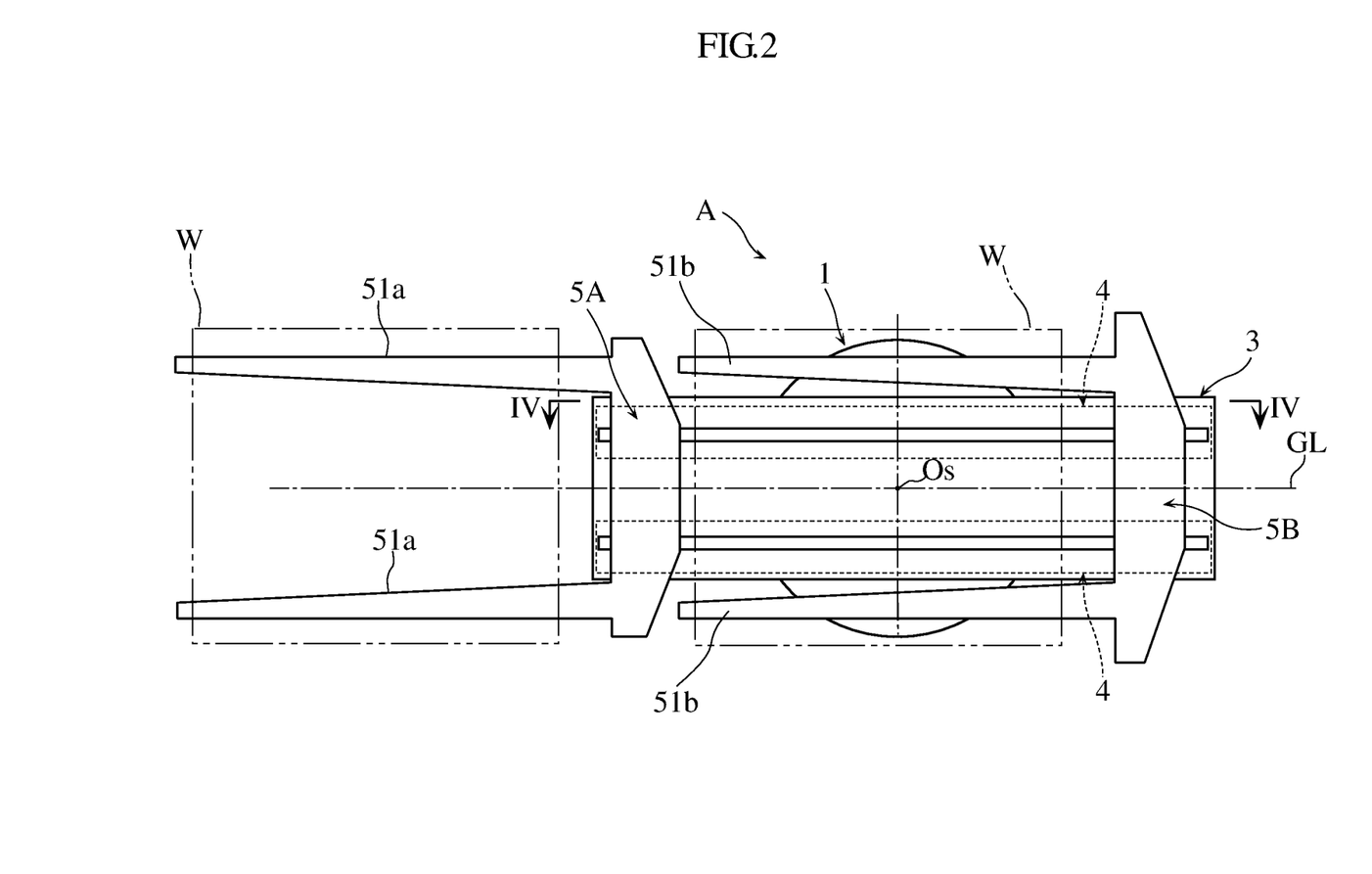
FIG. 2 is a plan view of the transfer robot shown in FIG. 1.
Figure 3:
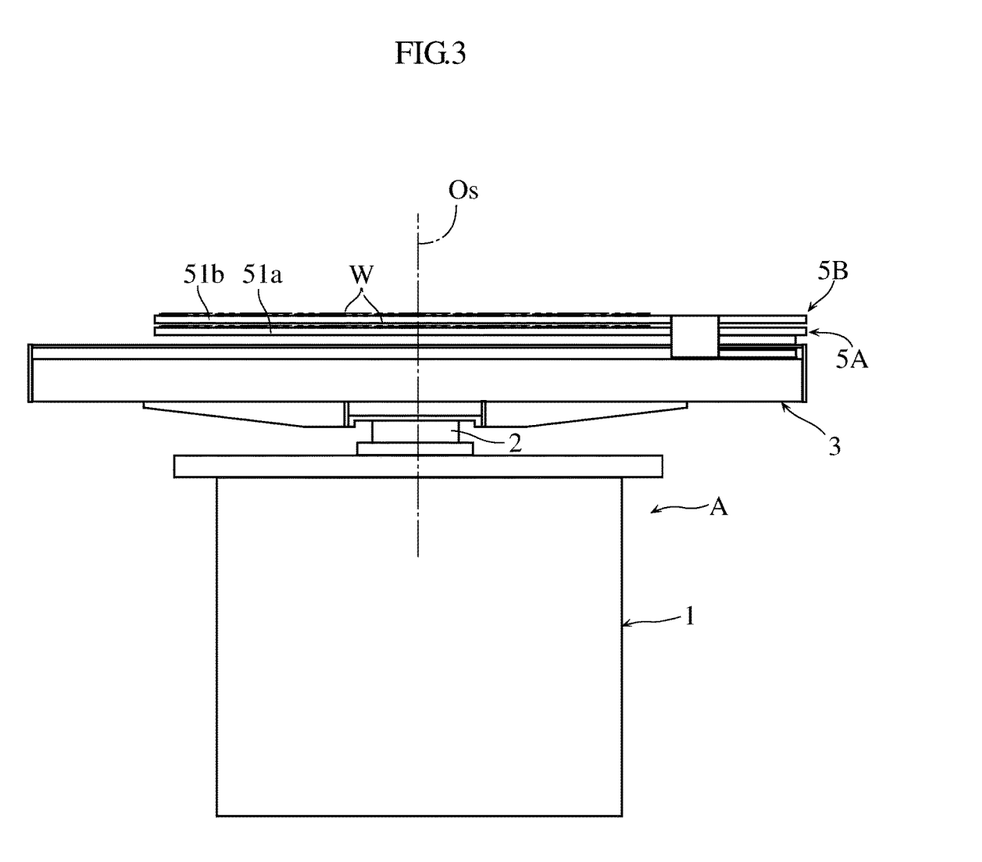
FIG. 3 is a side view of the transfer robot shown in FIG. 1.

FIGS. 1-3 show an example of transfer robot including a belt driving apparatus according to the present invention. The transfer robot A is designed to transfer a workpiece W in the form of a thin plate such as a substrate for making a liquid crystal display panel. The transfer robot A includes a stationary base 1, a rotary base 2 supported on the stationary base 1, a guide member 3 supported on the rotary base 2, belt driving apparatuses 4 (see FIG. 2) housed in the guide member 3, and two hands 5A and 5B individually supported by the guide member 3. The hands 5A and 5B are designed to hold the workpiece W in the form of a thin plate in a horizontal posture.

The rotary base 2 is supported on the stationary base 1 to be movable up and down and rotatable about a vertical rotation axis Os. In the stationary base 1 are provided an elevation motor and a rotation motor (not shown) which drive the rotary base 2 into up-and-down movement and rotational movement. The guide member 3 is shaped like a box that is an elongated rectangle as viewed in plan. The guide member 3 has in it a guide rail (not shown) for supporting the hands 5A and 5B individually. The hands 5A and 5B are slidable along a horizontal and straight movement path GL without interfering with each other while being supported by the guide rail.

As shown in FIGS. 1-4, the hand 5A and the hand 5B are integrally formed with holder pieces 51a and holder pieces 51b, respectively, which are in the form of a fork extending in the longitudinal direction of the guide member 3. A workpiece W in the form of a thin plate is placed on and held by the holder pieces 51a, 51b. Note that, unlike FIGS. 1 and 2, FIGS. 3 and 4 show a state in which both of the hands 5A and 5B are positioned above the stationary base 1.

The belt driving apparatuses 4 are provided for making the hands 5A and 5B to slide on the guide rail. The belt driving apparatuses 4 are provided in a pair correspondingly to the two hands 5A and 5B (see FIG. 2). A hand motor (not shown) for driving each hand 5A, 5B is provided in the stationary base 1. A driving force transmission mechanism for transmitting the driving force from the hand motor to the belt driving apparatus 4 is provided through the stationary base 1, the rotary base 2 and the guide member 3. Detailed explanation is omitted with respect to the support structure of the rotary base 2, the support structure of the hands 5A and 5B, and the driving force transmission mechanism for the belt driving apparatus 4. These can be realized by e.g. a structure similar to that disclosed in e.g. JP-A-2008-272847.

Figure 4:
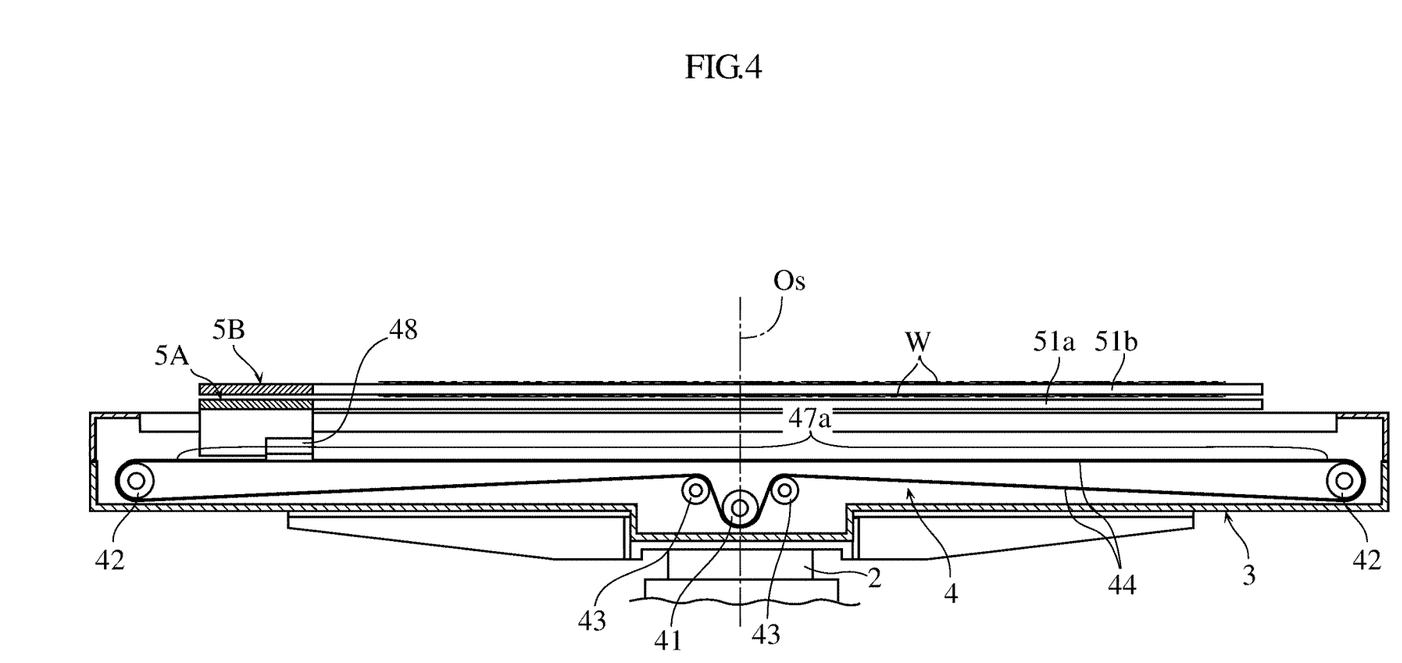
FIG. 4 is a partial sectional view taken along lines IV-IV in FIG. 2, showing a belt driving apparatus according to an embodiment of the present invention.

FIG. 4 shows the belt driving apparatus 4 of the embodiment. The belt driving apparatus 4 includes a driving pulley 41, two driven pulleys 42, two idler pulleys 43, and an endless output belt 44 (toothed belt) wound around the pulleys 41, 42 and 43. The driving pulley 41, the driven pulleys 42 and the idler pulleys 43 are supported by the guide member 3 and rotatable about respective axes which are substantially parallel to each other. Note that FIG. 4 and the subsequent figures show the belt driving apparatus 4 for the hand 5A, and the belt driving apparatus 4 for the hand 5B has the same structure as that for the hand 5A.

Figure 5:
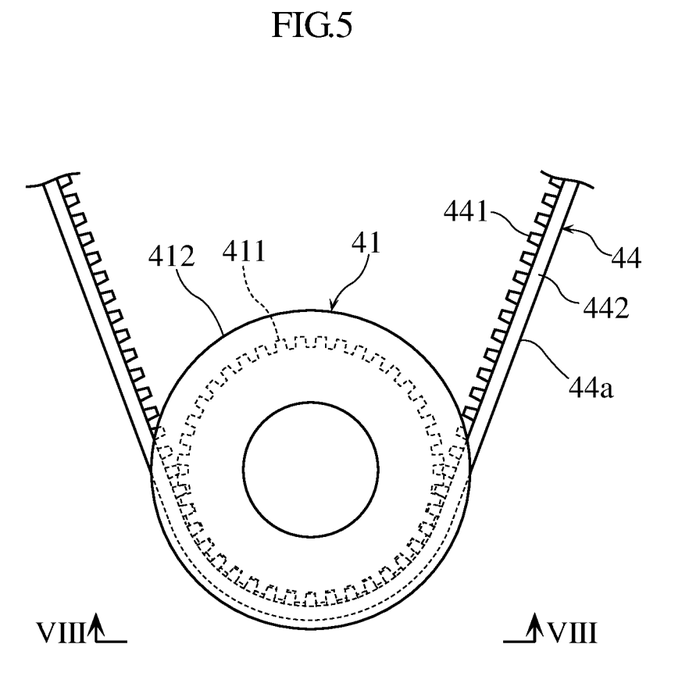
FIG. 5 is an enlarged view of part of the belt driving apparatus shown in FIG. 4.
Figure 6:
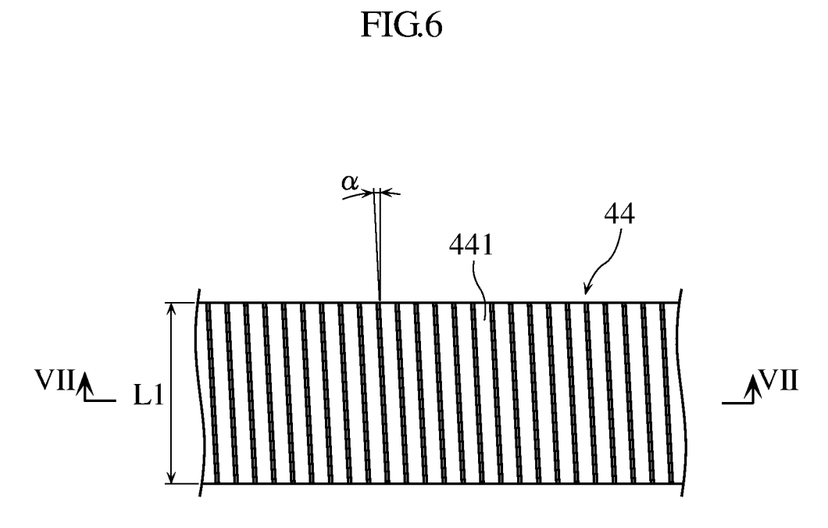
FIG. 6 is a partial development of a toothed belt.
Figure 7:
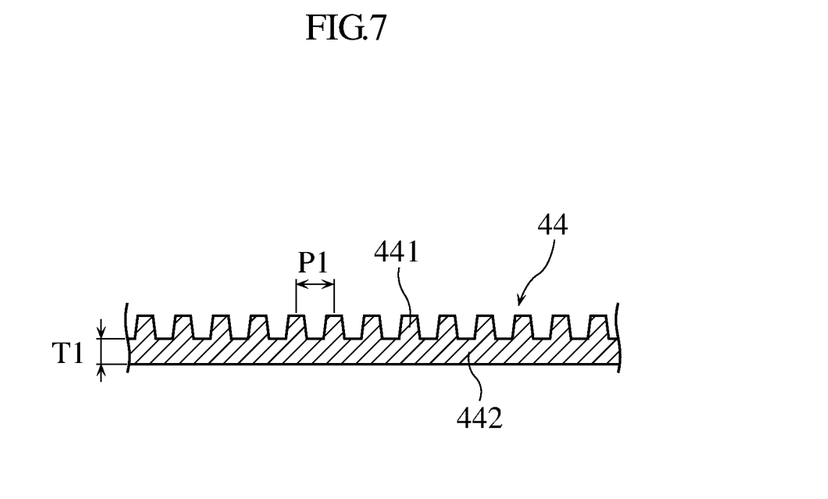
FIG. 7 is a sectional view taken along lines VII-VII in FIG. 6.

As shown in FIGS. 5-7, the output belt 44 is a timing belt (toothed belt) having teeth 441 on the inner surface. The output belt 44 of this embodiment is made of e.g. an open-end belt that can easily be made longer. An open end belt is obtained by helically cutting, at a constant width, a cylindrical belt material having axially extending ribs. By bonding the two ends of the open-end belt together by heat sealing, an endless output belt 44 having a desired length is obtained. As shown in FIG. 6, the teeth 441 on the inner surface of the output belt 44 obtained in this way are slightly inclined with respect to the width direction of the belt.

As the material for the output belt 44, vinylidene fluoride-based fluorocarbon rubber (FKM) that can be adapted for use in high temperature environment (e.g. about 160° C.) is suitably used. Use may also be made of an output belt 44 of which strength is enhanced by embedding in the main body portion 442 of the output belt 44 a glass core wire as a reinforcing material extending in the belt travel direction. Such an output belt containing a glass core wire does not largely change its length due to tension load or temperature change. For example, the output belt 44 is about 5-10 m in overall length in the travel direction, about 60 mm in width L1, and about 2 mm in thickness T1 of the main body portion 442. The pitch P1 of the teeth 441 is about 8 mm, and the inclination angle $\alpha$ of the teeth 441 with respect to the width direction is about 1°.

As shown in FIG. 4, the driving pulley 41 is arranged adjacent to the center of the guide member 3 in the longitudinal direction. The driving pulley 41 is rotatable along with an input shaft (not shown) rotated by a driving force from the above-described driving force transmission mechanism.

Figure 8:
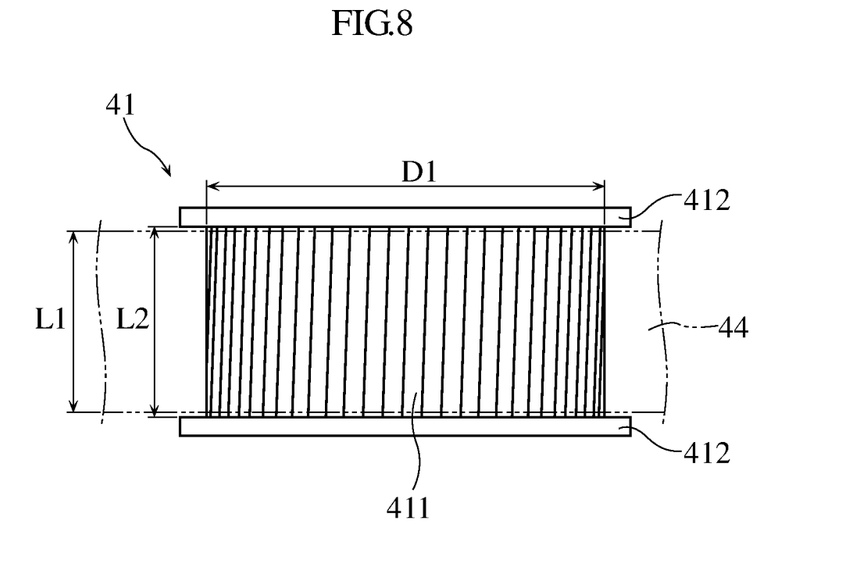
FIG. 8 is a view in the direction of the arrows VIII-VIII in FIG. 5.

As shown in FIGS. 5 and 8, the driving pulley 41 is a toothed pulley having an outer circumference provided with mating teeth 411 arranged in the rotation direction. The driving pulley 41 has a ring-shaped collar portion 412 projecting radially outward at each of the ends that are spaced in the axial direction. The mating teeth 411 are configured to mesh with the teeth 441 of the output belt 44. In this embodiment, the mating teeth 411 are inclined with respect to the axial direction so as to correspond to the teeth 441 of the output belt 44.

As shown in FIG. 8, the output belt 44 is mounted such that a slight clearance is defined between each end of the driving pulley 41 in the width direction and the adjacent collar portion 442. For instance, the driving pulley 41 is about 130 mm in diameter D1 of the outer circumference where the mating teeth 411 are formed, and about 63 mm in the dimension L2 between the two collar portions 412 (the length of the mating teeth 441 in the axial direction). Note that the output belt 44 is indicated by imaginary lines in FIG. 8.

Figure 9:
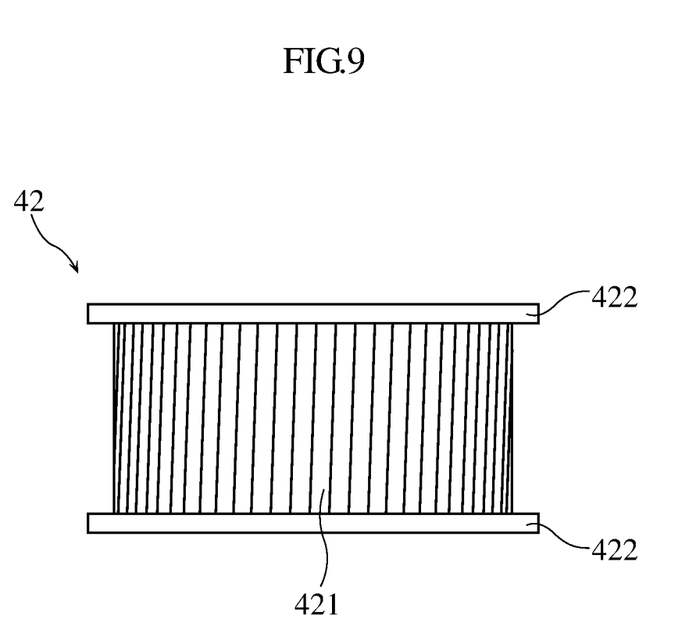
FIG. 9 is a view showing a driven pulley, as viewed in the same way as FIG. 8.

As shown in FIG. 4, the driven pulleys 42 are arranged adjacent to two ends of the guide member 3 which are spaced from each other in the longitudinal direction. Each of the driven pulleys 42 is rotatably supported by a support shaft (not shown). Each of the driven pulleys 42 has the substantially same structure as that of the driving pulley 41. Specifically, as shown in FIG. 9, each driven pulley 42 has mating teeth 421, and a collar portion 422 at each of the ends that are spaced in the axial direction.

Figure 10:
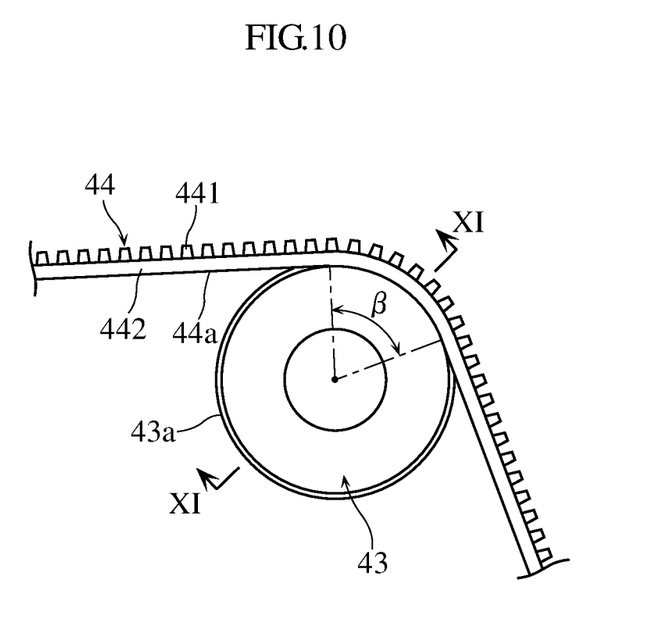
FIG. 10 is a partial enlarged view of the belt driving apparatus shown in FIG. 4.

As shown in FIG. 4, the two idler pulleys 43 are arranged to sandwich the driving pulley 41 in the travel direction of the output belt 44. Each of the idler pulleys 43 is rotatably supported by a support shaft. The idler pulleys 43 are held in contact with the outer surface 44a of the output belt 44 to apply tension to the output belt 44. As shown in FIGS. 10 and 11, each idler pulley 43 has a belt contact surface 43a that rotates about an axis while coming into contact with the outer surface 44a of the output belt 44. The idler pulley 43 gradually bulges to increase its diameter as proceeding from each of two end portions toward the center portion in the width direction of the belt contact surface 43a. Examples of the dimensions of the idler pulley 43 are as follows: the width L3 is about 100 mm, the diameter D2 of the maximum diameter portion at the center in the width direction is about 100 mm, and the diameter D3 of the minimum diameter portion at each end in the width direction is about 98 mm. The maximum diameter portion bulges relative to the minimum diameter portion by about 1 mm in the radial direction.

In this embodiment, both of the two idler pulleys 43 are arranged adjacent to the driving pulley 41. As will be understood from FIGS. 4 and 10, the contact region between the belt contact surface 43a of the idler pulley 43 and the outer surface 44a of the output belt 44 forms a winding angle β of e.g. not less than 50° with respect to the axis of the idler pulley 43 in the circumferential direction of the belt contact surface 43a.

Figure 12:
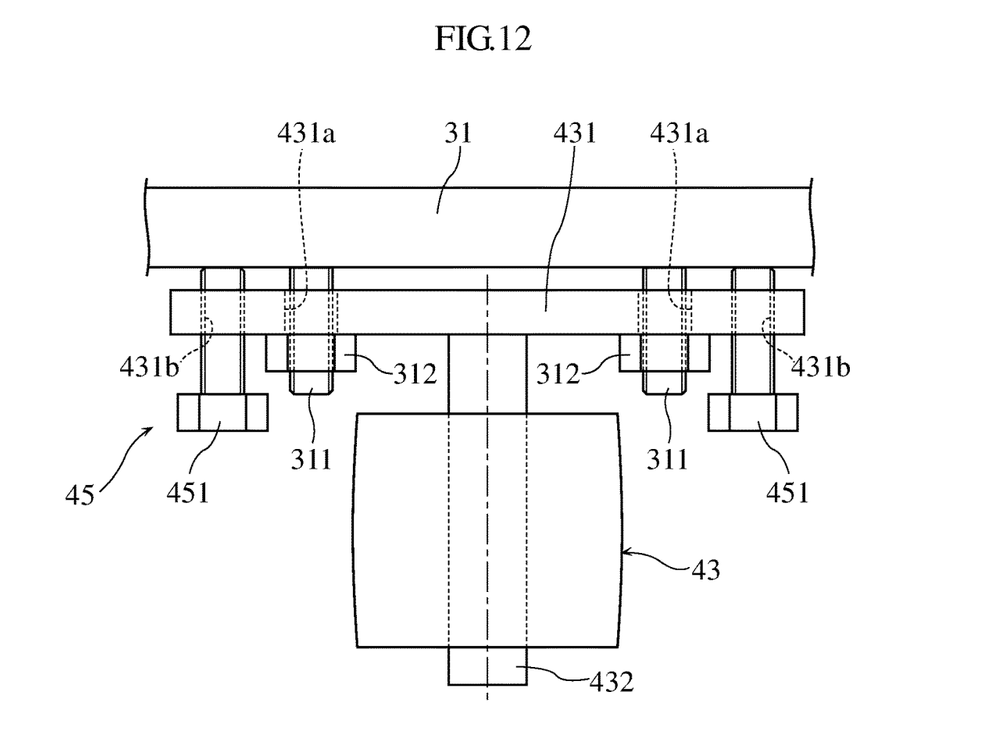
FIG. 12 is a schematic view for describing an angle adjustment mechanism, viewed in a direction perpendicular to the axis of an idler pulley.
Figure 13:
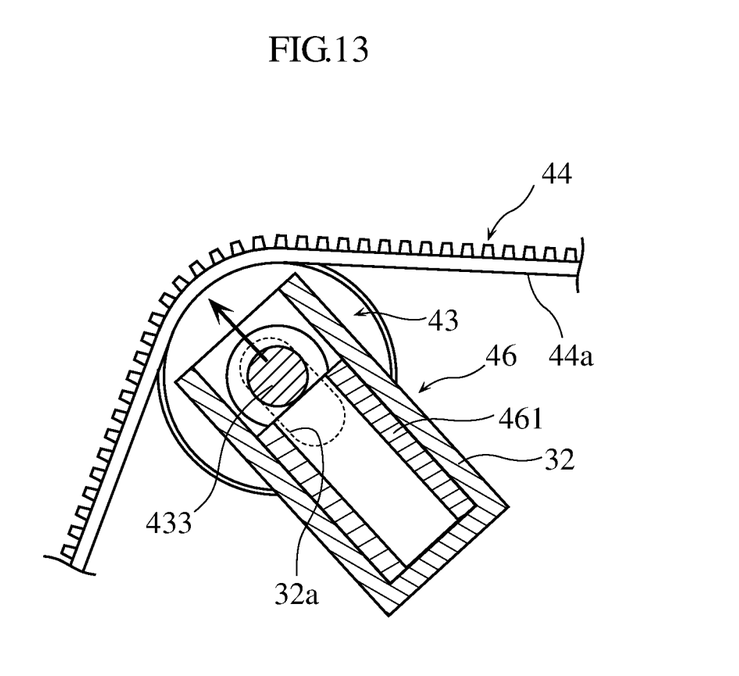
FIG. 13 is a schematic view for describing an auto tension mechanism, in section cut perpendicularly to the axis of an idler pulley.

The belt driving apparatus 4 of this embodiment further includes an angle adjustment mechanism 45 (see FIG. 12) and an auto tension mechanism 46 (see FIG. 13). The angle adjustment mechanism 45 is a mechanism for adjusting the angle of the axial direction of the idler pulley 43 with respect to the axial direction of the driving pulley 41. In this embodiment, angle adjustment is made possible with respect to one of the two idler pulleys 43. For instance, as shown in FIG. 12, the idler pulley 43 is supported on a support shaft 432 having an end connected to a mounting flange 431. The mounting flange 431 is attached to a support base 31 fixed to the guide member 3 (not shown in FIG. 12). The mounting flange 431 has a plurality of through-holes 431a and a plurality of threaded holes 431b. In each of the through-holes 431a, a mounting bolt 311 having a base end embedded in the support base 31 is inserted. By tightening a nut 312 from the front end side of the mounting bolt 311, the mounting flange 431 is fastened to the support base 31. An adjustment bolt 451 is screwed into each of the threaded holes 431b. When one of the adjustment bolts 451 is tightened to press its end against the support base 31, the portion of the mounting flange 431 where the adjustment bolt 451 is attached moves away from the support base 31, so that the axial direction of the idler pulley 43 changes. By appropriately adjusting the distance between the support base 31 and the portion of the mounting flange 431 where each adjustment bolt 451 is attached, the axial direction of the idler pulley 43 is adjusted properly.

The auto tension mechanism 46 is a mechanism for applying tension to the output belt 44 by biasing the outer surface 44a. As shown in FIG. 13, the auto tension mechanism 46 includes a compression coil spring 461 as a biasing member. The compression coil spring 461 is supported in such a manner as to keep a predetermined posture by a support member 32 fixed to the guide member 3 (not shown in FIG. 13). The compression coil spring 461 resiliently pushes the support shaft 43 of the idler pulley 43 that is different from the idler pulley 43 provided with the angle adjustment mechanism 45. The support shaft 433 is received in an elongated hole 32a formed in the support member 32, so that the support shaft 433 (the idler pulley 43) is slidably movable along the elongated hole 32a. With this arrangement, the resilient force of the compression coil spring 461 applies appropriate tension to the output belt 44.

As shown in FIG. 4, the travel path of the output belt 44 wound around the driving pulley 41 and the driven pulleys 42 includes a straight travel section 47a above the driven pulleys 42. The output belt 44 is reciprocally movable in the straight travel section 47a. The output belt 44 is provided with a carriage 48 at a predetermined position in the straight travel section 47a, and the carriage 48 is connected to the hand 5A. Thus, when the output belt 44 moves reciprocally due to rotation of the driving pulley 41, the carriage 48 moves reciprocally along with the output belt 44 in the straight travel section 47a. Following the movement of the carriage 48, the hand 5A slides horizontally along the movement path GL while being support by the guide rail. The length of the straight travel section 47a is set relatively long in order to respond to an increase in size of the workpieces to be transferred by the hand 5A and an increase in transfer distance, and may be e.g. 4 m. There is a demand for faster transfer of workpieces using the transfer robot A. The movement speed of the hands 5A, 5B (output belt 44) in transferring a workpiece is e.g. about 3 m/sec at the maximum.

The advantages of the belt driving apparatus 4 according to the foregoing embodiment are described below.

The idler pulleys 43 apply tension from the outer side to the output belt 44 that has teeth 441 on the inner surface. As noted before, each idler pulley 43 gradually bulges as proceeding from each end toward the center in the width direction. Thus, the idler pulley 43 applies a larger tension to the output belt 44 at the center in the width direction of the belt contact surface 43a than at other portions. Generally, belts tend to shift toward a higher tension side during its traveling. Thus, as shown in FIG. 11, when the output belt 44 of this embodiment reciprocates, the position of the output belt 44 is maintained at the center in the width direction of the belt contact surface 43a. Thus, during the reciprocal movement, the output belt 44 is prevented from deviating toward one side in the axial direction of the pulley. As a result, the output belt 44 is prevented from coming into contact with the collar portions 412 and 422 of the driving pulley 41 and the driven pulleys 42, which leads to a longer life of the output belt 44.

In the foregoing embodiment, the driving pulley 41 or the driven pulleys 42, which are designed as toothed pulleys, are not configured to gradually bulge toward the center, but the idler pulleys 43 for coming into contact with the flat outer surface 44a of the output belt 44 are configured to gradually bulge toward the center. As compared with the case where the driven pulleys 42 are configured into a bulging shape, configuring the idler pulleys 43 into a bulging shape does not require a complicated working process or the like and does not largely increase the cost for manufacturing the belt driving apparatus 4.

The teeth 441 on the inner surface of the output belt 44 are inclined with respect to the width direction of the output belt 44, and the mating teeth 411, 421 of the driving pulley 41 and the driven pulleys 42 are inclined with respect to the respective axial directions, correspondingly to the teeth 441. Such inclination of the teeth 441 causes the output belt 44 to deviate toward one side in the width direction during its traveling. During the reciprocal movement of the output belt 44 in the straight movement section 47a, the output belt 44 tends to deviate toward one side in the width direction when moving in one direction and deviate toward the other side in the width direction when moving in the other direction. The action of the idler pulley 43 to correct the position of the output belt 44 to the center in the width direction is more effective when the idler pulley 43 is positioned on the downstream side of the driving pulley 41 in the belt travel direction than when the idler pulley 43 is positioned on the upstream side. In the foregoing embodiment, the idler pulley 43 is provided on each side of the driving pulley 41 in the belt travel direction. This arrangement assures that the output belt 44 does not deviate toward either side in the width direction during the reciprocal movement.

The idler pulleys 43 are provided adjacent to the driving pulley 41, and the outer surface 44a of the output belt 44 is in contact with the belt contact surface 43a of each idler pulley 43 over the winding angle β of not less than 50°. Achieving winding of the output belt 44 over a certain winding angle assures that tension is properly applied to the output belt 44 and the position of the output belt 44 is properly maintained at the center in the width direction.

As noted before, the belt driving apparatus 4 of the foregoing embodiment includes the angle adjustment mechanism 45 for adjusting the axial direction of the idler pulley 43 relative to the axial direction of the driving pulley 41. Thus, even when a different output belt 43 is used, deviation of the output belt 43 in the width direction during traveling is prevented by appropriately adjusting the axial direction of the idler pulley 43 for that output belt 43.

As described with reference to FIG. 13, the belt driving apparatus 4 of the foregoing embodiment includes the auto tension mechanism 46. The transfer robot A including the belt driving apparatus 4 of the foregoing embodiment may be used under high-temperature environment. When the transfer robot A is used under high-temperature environment, the distance between the two driven pulleys 42 may increase, so that the output belt 44 may be pulled. In such a case, the idler pulley 43 moves in a direction to reduce the tension applied on the output belt 44, while receiving the resilient force of the compression coil spring 461. In this way, the tension to the output belt 44 is properly adjusted.

Though an embodiment of the present invention has been described above, the technical scope of the present invention is not limited to the foregoing embodiment. The specific structure of each part of the belt driving apparatus according to the present invention can be varied in design in many ways without departing from the spirit of the invention.

Figure 14:
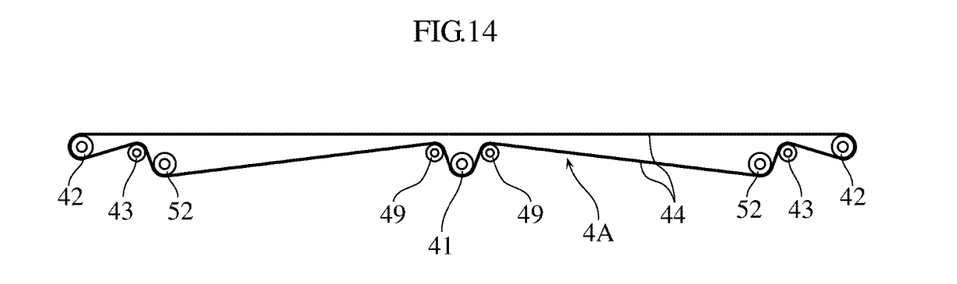
FIG. 14 is a schematic structural view showing another example of a belt driving apparatus.

In the foregoing embodiment, the idler pulleys 43 each having a bulging shape are arranged adjacent to the driving pulley 41, as described with reference to FIG. 4. However, the arrangement of the idler pulleys 43 is not limited to this. For instance, instead of the structure shown in FIG. 4, the idler pulleys 43 may be arranged adjacent to the driven pulleys 42 (the first and the second driven pulleys) defining the straight travel section, as shown in FIG. 14. In this belt driving apparatus 4A shown in FIG. 14, an additional driven pulley 52 is provided adjacent to each idler pulley 43 on the side opposite from the driven pulley 42. Provision of the additional driven pulleys 52 provides a sufficiently large winding angle of the output belt 44 around each idler pulley 43. Further, in the belt driving apparatus 4A, idler pulleys 49 each having a normal cylindrical shape, not a bulging shape, are provided on each side of the driving pulley 41, to provide a sufficiently large winding angle of the output belt 44 around the driving pulley 41.

Figure 15:
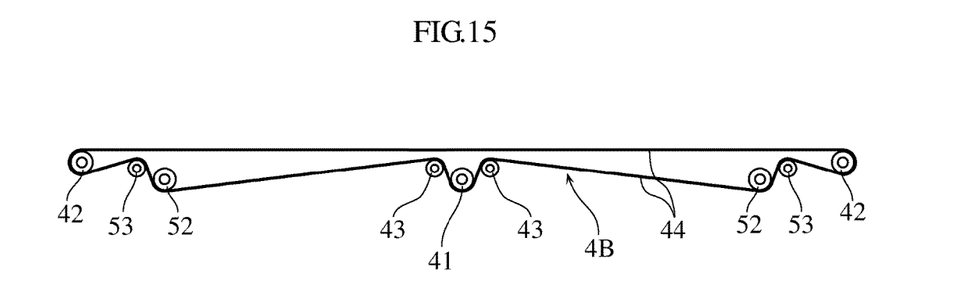
FIG. 15 is a schematic structural view showing another example of a belt driving apparatus.

Alternatively, as shown in FIG. 15, additional idler pulleys 53 each having a bulging shape may be provided adjacent to the driven pulleys 42 (the first and the second driven pulleys), in addition to the idler pulleys 43 arranged adjacent to the driving pulley 41. In this belt driving apparatus 4B shown in FIG. 15, an additional driven pulley 52 is provided adjacent to each of the additional idler pulleys 53 on the side opposite from the driven pulley 42. Provision of the additional driven pulleys 52 provides a sufficiently large winding angle of the output belt 44 around each additional idler pulley 53.

Figure 16:
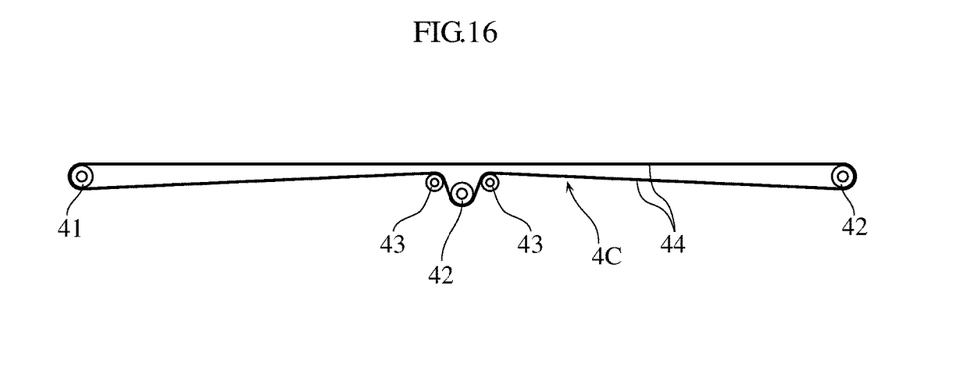
FIG. 16 is a schematic structural view showing another example of a belt driving apparatus.

In the foregoing embodiment described with reference to FIG. 4, the driving pulley 41 is arranged between two driven pulleys 42 spaced from each other. However, the arrangement of the driving pulley 41 is not limited to this. For instance, as shown in FIG. 16, the driving pulley 41 may be arranged at the position where one of the two driven pulleys 42 is arranged in the structure shown in FIG. 4. In this belt driving apparatus 4C shown in FIG. 16, a driven pulley 42 is arranged at the position where the driving pulley 41 is arranged in the structure shown in FIG. 4.

In the belt driving apparatus of the foregoing embodiment, the output belt is moved reciprocally so that the carriage (object to be moved) moves reciprocally in accordance with the movement of the output belt. However, the present invention is not limited to this arrangement. For instance, the belt driving apparatus may not include the carriage but may be designed such that the output belt rotates in one direction instead of moving reciprocally.

The invention claimed is:

1. A transfer robot comprising:
a belt driving apparatus; and
a hand attached to the belt driving apparatus;
the belt driving apparatus includes:
a driving pulley including an outer circumference surface provided with a plurality of teeth;

a first driven pulley including an outer circumference surface provided with a plurality of teeth;

a second driven pulley including an outer circumference surface provided with a plurality of teeth;

an endless toothed belt wound around the driving pulley, the first driven pulley and the second driven pulley, the toothed belt including an inner surface provided with a plurality of teeth meshing with the plurality of teeth of each of the driving pulley, the first driven pulley and the second driven pulley; and first and second idler pulleys each including a belt contact surface in contact with an outer surface of the toothed belt, each of the first idler pulley and the second idler pulley including, along a width direction of the belt contact surface, a larger-diameter portion and two smaller-diameter portions sandwiching the larger-diameter portion, the larger-diameter portion being greater in diameter than each of the two smaller-diameter portions, wherein the first idler pulley and the second idler pulley are arranged to sandwich the driving pulley in a travel direction of the toothed belt, the plurality of teeth of the toothed belt are inclined with respect to a width direction of the toothed belt, the plurality of teeth of the driving pulley are inclined with respect to an axis of the driving pulley in a manner corresponding to the plurality of teeth of the toothed belt, the plurality of teeth of each of the first and the second driven pulleys are inclined with respect to an axis of the respective first and second driven pulleys in a manner corresponding to the plurality of teeth of the toothed belt, and in each of the first and the second idler pulleys, the two smaller-diameter portions and the larger-diameter portion are configured to correct deviation of the toothed belt toward either side of the belt contact surface in a width direction of the belt contact surface, when the deviation of the toothed belt is caused by inclination of the teeth of the driving pulley with respect to the axis of the driving pulley or by inclination of the teeth of each driven pulley with respect to the axis of each driven pulley.

2. The transfer robot according to claim 1, wherein each of the first and the second idler pulleys has a winding angle indicating a contact region between the belt contact surface of said each of the first and the second idler pulleys and the flat outer surface of the toothed belt, and the winding angle is not less than 50°.

3. The transfer robot according to claim 1, further comprising an auto tension mechanism including a biasing member for urging the flat outer surface of the toothed belt via the first idler pulley.

4. The transfer robot according to claim 1, further comprising a carriage provided on the toothed belt and attached to the hand, wherein the first driven pulley and the second driven pulley define therebetween a straight travel section in which the toothed belt is caused to move along a straight travel path, and the carriage is moved reciprocally in the straight travel section.

5. The transfer robot according to claim 1, further comprising first and second shafts that rotatably support the first and the second idler pulleys, respectively, wherein each of the first and the second shafts has a horizontal axis that is perpendicular to a direction of earth's gravity.

6. The transfer robot according to claim 5, wherein the driving pulley has a horizontal rotation axis that is lower than the horizontal axis of each of the first and the second shafts in the direction of earth's gravity.

7. The transfer robot according to claim 1, wherein a length of the toothed belt between the driving pulley and the first idler pulley is smaller than a length of the toothed belt between the first idler pulley and the first driven pulley.

8. The transfer robot according to claim 7, wherein a length of the toothed belt between the driving pulley and the second idler pulley is smaller than a length of the toothed belt between the second idler pulley and the second driven pulley.

9. The transfer robot according to claim 8, wherein the length of the toothed belt between the driving pulley and the first idler pulley is substantially equal to the length of the toothed belt between the driving pulley and the second idler pulley.

10. The transfer robot according to claim 1, wherein the driving pulley is provided with a pair of collar portions flanking the plurality of teeth of the driving pulley, and the toothed belt has a width that is smaller than a distance between the pair of collar portions of the driving pulley.

11. The transfer robot according to claim 10, wherein the belt contact surface of each of the first and the second idler pulleys has a width that is greater than the distance between the pair of collar portions of the driving pulley.

12. The transfer robot according to claim 1, wherein a difference between a maximum diameter of the larger-diameter portion and a minimum diameter of one of the smaller-diameter portions is smaller than a thickness of the toothed belt.

13. The transfer robot according to claim 1, wherein a difference between a maximum diameter of the larger-diameter portion and a minimum diameter of one of the smaller-diameter portions is smaller than a pitch of the teeth of the toothed belt.

14. A transfer robot comprising:
a belt driving apparatus; and
a hand attached to the belt driving apparatus;
the belt driving apparatus includes:
a driving pulley including an outer circumference surface provided with a plurality of teeth;
a first driven pulley including an outer circumference surface provided with a plurality of teeth;
a second driven pulley including an outer circumference surface provided with a plurality of teeth;
an endless toothed belt wound around the driving pulley, the first driven pulley and the second driven pulley, the toothed belt including an inner surface provided with a plurality of teeth meshing with the plurality of teeth of each of the driving pulley, the first driven pulley and the second driven pulley; and
first and second idler pulleys each including a belt contact surface in contact with an outer surface of the toothed belt, each of the first idler pulley and the second idler pulley including, along a width direction of the belt contact surface, a larger-diameter portion and two smaller-diameter portions sandwiching the larger-diameter portion, the larger-diameter portion being greater in diameter than each of the two smaller-diameter portions,
wherein the first idler pulley and the second idler pulley are arranged to sandwich the driving pulley in a travel direction of the toothed belt,
the plurality of teeth of the toothed belt are inclined with respect to a width direction of the toothed belt, the plurality of teeth of the driving pulley are inclined with respect to an axis of the driving pulley in a manner corresponding to the plurality of teeth of the toothed belt, the plurality of teeth of each of the first and the second driven pulleys are inclined with respect to an axis of the respective first and second driven pulleys in a manner corresponding to the plurality of teeth of the toothed belt, and inclination of the teeth of the driving pulley with respect to the axis of the driving pulley or inclination of the teeth of each driven pulley with respect to the axis of said each driven pulley causes a first deviation of the toothed belt toward a first side of the belt contact surface in response to movement of the toothed belt in a first direction while also causing a second deviation of the toothed belt toward a second side of the belt contact surface opposite to the first side in response to movement of the toothed belt in a second direction opposite to the first direction, the first idler pulley being located downstream from the driving pulley when the toothed belt moves in the first direction for more effectively correcting the first deviation of the toothed belt than the second idler pulley, the second idler pulley being located downstream from the driving pulley when the toothed belt moves in the second direction for more effectively correcting the second deviation of the toothed belt than the first idler pulley.

* * * * *